United States Patent Office 3,536,786
Patented Oct. 27, 1970

3,536,786
HIGH-IMPACT, HIGH TEMPERATURE THERMO-PLASTIC AND METHOD OF PREPARING SAME
Elmer J. De Witt, Cuyahoga Falls, and John F. Coleman, Dayton, Ohio, assignors to The B. F. Goodrich Company, New York, N.Y., a corporation of New York
No Drawing. Filed Sept. 18, 1967, Ser. No. 668,654
Int. Cl. B29c *25/00;* C08f *19/10*
U.S. Cl. 260—880           6 Claims

ABSTRACT OF THE DISCLOSURE

Thermoplastic, transparent and impact-resistant resinous alloys having heat distortion temperatures from about 115° C. and 140° C. or more comprise from 65 to 80% by weight of a binary copolymer of 35 to 65% by weight of combined alpha-methyl styrene and 65% to 35% by weight of combined methyl methacrylate over-polymerized on from 20 to 35% by (dry) weight of the latex particles of a rubbery gel-containing, high Mooney terpolymer prepared by polymerizing a mixture containing 35% to 55% by weight of butadiene, from 5% to 30% of methyl methacrylate, and from 20% to 60% of methyl acrylate. Such alloys are tough, stable structural plastics of moderate cost useful as superior replacements in many applications for polymethyl methacrylate, the polycarbonates and other water-white transparent and translucent structural thermoplastics.

BACKGROUND OF INVENTION

Polymethyl methacrylate is perhaps the best known hard, structural thermoplastic resinous material useful for transparent, translucent or light colored applications. However, this material is inherently quite brittle, has been relatively expensive, and has an ASTM heat distortion temperature (HDT, ° C.) below about 100° C. making the resin too easily softened in many modern applications. Polystyrene is a less expensive material but is similar in its deficiencies. The polycarbonate resins have some outstanding properties, for example, high transparency, good impact strength and an HDT of 135° to 140° C. However, the polycarbonates have been extremely expensive and are likely to remain so, they are poor on weathering and have high processing viscosities. As a result, the polycarbonates are unlikely to satisfy the need for temperature- and impact-resistant, water-white thermoplastics of general application. No known thermoplastic has been available which is of modest cost and which possesses the combination of hardness, transparency, stability, high resistance to impact and high resistance to heat distortion (i.e. HDT above about 110° C.).

PRIOR ART

The polymers of alpha-methyl styrene and their properties are not too well known and have not achieved widespread commercial use because this monomer has been found to be difficult to polymerize, the polymers of only modest properties. Known copolymers of alpha-methyl styrene have usually been prepared by mass or bulk polymerization at high temperatures using massive doses of free radical type catalysts. As a result, the latter products have been low both in alpha-methyl styrene content and in molecular weight and, as a result, have been of modest properties. U.S. Pat. 3,135,723, for example, discloses the copolymerization of a mixture of 65 to 85 parts by weight of methyl methacrylate with 15 to 35 parts by weight of alpha-methyl styrene by mass polymerization carried out in two stages, the first stage being a slow heating up to 90° to 100° C. over a period of about 2 days and the second stage, being carried out at 115° C. to 150° C. with the second stage being prolonged in some cases for an additional 40 to 70 hours. The reaction times shown in the latter patent are so long as to require the use, preferably, of two or more different catalysts, each having half lives sufficiently long at high temperatures up to 150° C. as to ensure sustained catalytic activity. A. V. Golubeva, N. V. Usmanova and K. A. Sivograokova, in Plasticheskie Massey, No. 12, pp. 4–6 (1960) show the preparation of various copolymers of alpha-methyl styrene, including copolymers with methyl methacrylate, by polymerization in aqueous emulsion for unspecified periods using potassium persulfate as the initiator at 75° to 80° C. and the authors report that increasing the proportion of alpha-methyl styrene in the monomeric mixture noticeably reduces the rate of polymerization and the degree of conversion. U.S. Pats. 3,072,622 and 3,135,723 show the copolymerization of mixtures containing 10 to 40 parts by weight of alpha-methyl styrene and 90 to 60 parts by weight of methyl methacrylate with the reaction being carried out in bulk with a gradually increasing reaction temperature in the range of 90° to 160° C. and a total reaction time extending over many days. These and other authors report good properties for the polymers of alpha-methyl styrene, especially high resistance to heat distortion, but the methods and procedures employed are so tortuous and expensive as to be beyond the realm of commercial reality.

It has also been reported, in U.S. Pat. 2,887,464 that copolymers of alpha-methyl styrene and methyl methacrylate prepared by polymerization in aqueous emulsion at 50° C. for 48 hours of a mixture high in methyl methacrylate (90%/wt.) and low in alpha-methyl styrene (10%), the product being reported as containing only 20% by weight of combined alpha-methyl styrene. The latter patent reports that the resulting copolymers could be mixed with a rubbery polyacrylate or with a rubbery butadiene polymer prepared from a monomeric mixture of (1) 50 to 90% by weight of butadiene and (2) 10 to 50% by weight of a different monoolefinic polymerizable compound such as styrene to produce a product having better flow rates and good extensibility. U.S. Pat. 3,230,-277 discloses the mass polymerization of mixtures of 10 to 55 parts by weight of alpha-methyl styrene and 90 to 45 parts by weight of methyl methacrylate, in which cis-polybutadiene had been dissolved, the reaction being carried out at 90 to 115° C. using benzoyl peroxide catalyst and tertiary dodecyl mercaptan modifier using a two-stage reaction extending over 6 days. The single example of the latter patent utilized 25 parts by weight of alpha-methyl styrene and 75 parts by weight of methyl methacrylate into which from 2 to 20% of the cis-polybutadiene had been incorporated producing products having an ASTM heat distortion temperature ranging from 115° to 122° C. with, respectively, notched Izod values of 1.28 to 0.22 ft. lbs./in. These processes are not practical and the products of modest properties due to the high polymerization temperatures, limited molecular weight and limited proportion of alpha-methyl styrene combined in the product. Moreover, the butadiene rubbers employed have a high degree of unsaturation and, for this reason, can not be stable at the processing and service life temperatures to be expected in a polymer of alpha-methyl styrene.

SUMMARY OF THE INVENTION

The present invention relates to resinous compositions, blends or alloys of (1) a binary copolymer of alpha-methyl styrene and methyl methacrylate and (2) a rubbery, tough, high Mooney, ternary copolymer or terpolymer of high gel content and low unsaturation, which compositions are of modest cost, have a high degree of transparency, have good resistance to degradation by light, heat and weather, have high heat distortion temperatures in the range from 110° C. to 140° C. or more, and are tough and non-brittle by reason of notched Izod Impact strength (ft. lbs./in. of notch by ASTM–D648 at 264 p.s.i.) of at least 0.5, and preferably of at least 1.0 and on up to 3 or 4 or more. The present invention also relates to a practical, low-cost method of making such compositions, blends or alloys.

More particularly, the invention relates to binary polymeric compositions, blends, or alloys containing (1) from about 65% to about 80% by weight of the binary copolymer in which from about 35% to about 65% by weight of alpha-methyl styrene (hereinafter abbreviated "AMS") is combined and from about 65% to about 35% by weight of methyl methacrylate (hereinafter abbreviated "MMA") is combined, which binary copolymer has moderate to high molecular weight as shown by intrinsic viscosity values from at least 0.35 up to 2.5 or more and (2) from about 20% to about 35% by weight of latex-sized particles of a rubbery, gelled terpolymer which has both a low degree of unsaturation and an index of refraction similar to that of the binary copolymer by reason of its being produced by the polymerization of a monomeric mixture of from about 35% to about 55% by weight of butadiene, from about 5% to about 30% by weight of MMA and the remainder constituting from about 20% to about 60% by weight of methyl acrylate. These selected polymers, their composition and their relative proportions are critical in that at least one or more desirable characteristics such as impact strength, heat distortion temperature, stability, processability, transparency, or the like are impaired outside of the stated ranges.

BINARY COPOLYMER COMPOSITION

These copolymers containing a minimum of from about 35% by weight up to about 65% by weight of combined AMS when prepared with a moderate to high molecular weight as evidenced by intrinsic viscosities above about 0.35, and preferably above about 0.5, have very high HDT values above about 115° C. (non-annealed) and generally above about 120° C. (annealed) up to 160° C. or more (annealed). Listed below is a table of HDT values at various combined AMS levels.

| Percent/wt. AMS charged | Analysis percent/ wt. AMS | HDT, ° C. | Remarks |
| --- | --- | --- | --- |
| 35 | 35 | 131 | Not annealed. |
| 40 | 40 | 134 | Do. |
| 50 | 46 | 149 | Do. |
| 60 | 55 | 150 | Do. |
| 55 | 50 | [1] 159 | Annealed 1 hr. at 145° C. |
| 50 | 46 | [1] 156 | Do. |

[1] Resin heated overnight under vacuum at 150° C. to ensure complete removal of absorbed monomeric AMS (before molding).

Thus, the high quality AMS/MMA binary copolymers incorporated in the alloys of this invention rival or exceed even the polycarbonate resins in their intrinsic resistance to distortion by heat. Like polymerized MMA they are brittle, however, and it is an object of this invention to provide these copolymers in a toughened, impact-resistant form which retain most of the inherent HDT qualities of the basic binary copolymer. The rubbery terpolymer ingredient of the alloys of this invention accomplish this result very admirably. Other physical properties of the high quality binary AMS/MMA copolymers containing 45%/wt. or more of combined AMS are as follows:

| Property | Value |
| --- | --- |
| HDT—° C. at 264 p.s.i. (ASTM D–648): | |
| Not annealed | 140–150 |
| Annealed | 150–160 |
| Izod (notched) (ASTM D–256–56, method A): Ft. lbs./in. of notch at 264 p.s.i. | 0.2–0.3 |
| Tensile strength at 77° F. (ASTM D–638–61T; 2″/min. at 77° F.): | |
| Tensile, p.s.i. | 9000 |
| Elongation, percent | 1–2 |
| Light stability, weatherometer | Good |
| Transparency | Very good |
| Water absorption at 77° F. (ASTM D–570–63) percent: | |
| 1 day | 0.3 |
| 7 days | 0.5 |

MONOMER COMPOSITION FOR BINARY COPOLYMER

The composition of the monomeric mixture largely determines the composition of the resulting binary copolymer. As the proportion of AMS in the mixture increases in the range of 35% to 70%/wt., the proportion of combined AMS in the copolymer increases, the binary copolymer molecular weight decreases, reaction rates decrease, and the maximum attainable degree of conversion also decreases. For example, at a concentration of 30%/wt. of monomeric AMS in the mixture, the proportion of combined AMS in the copolymer is in the range of 25 to 30%/wt.; at a 50/50 ratio, the binary copolymer contains about 47%/wt. of combined AMS; at 55% AMS/45% MMA the corresponding value is 50%; at 60/40 it is 53%/wt.; and at 70/30 the combined AMS content is in the range of 61 to 65%/wt. Where a spread in composition is shown, allowance is being made for the smaller effects of reaction temperature and/or conversion. For example, a typical result is an increase in combined AMS of about 3% in going from a conversion in the range of 30 to 40% up to a conversion of about 80%. Similarly, composition can vary by 2 to 3% combined AMS in going from a reaction temperature of 50° C. to 70° C.

The proportion of AMS in the monomeric mixture, as indicated, has a strong depressing effect on the molecular weight of the binary copolymer produced. At 30% AMS in the mixture, it is possible to reach an intrinsic viscosity of 2.95 or more at a reaction temperature of 50° C. while at 70% AMS in the mixture, the corresponding intrinsic viscosity is about 0.65. The proportion of AMS in the charge also affects the maximum conversion, for example, at 50° C. a mixture containing 50 to 55%/wt. of monomeric AMS will react to 80% conversion in 28 to 34 hours while at 70° C., the reaction will proceed to about 85% conversion in 14 to 27 hours and reach a terminal conversion of no higher than about 90%. At 70% monomeric AMS, maximum or terminal conversion is about 70%.

PREPARATION OF BINARY COPOLYMER

The method of this invention comprises an over-polymerization carried out in aqueous emulsion or dispersion whereby a coating of the hard, horny binary AMS/MMA copolymer is deposited on the latex-sized particles of rubbery terpolymer. The latter particles have and average particle diameter ("DN" expressed as angstrom units "A.") of from about 100 to about 8000 A., more preferably from about 100 to about 3500 A., with strongest preference for the lower end of the range. Such over-polymerization must be carried out at moderate temperatures of from about 45° C. to about 75° C., more preferably at about 50° to about 70° C. in order to insure high combined AMS values and adequate molecular weight. For practical reaction rates and best latex stability, the aqueous emulsion or dispersion must contain (1) a water-soluble synthetic dispersant such as one of the organic sulfate and organic sulfonate types and (2) a water-soluble peroxy-type catalyst such as potassium persulfate, potassium persulfate/potassium bisulfate redox combinations, hydrogen peroxide and others. Carboxylic acid soaps produce fewer and larger particles and slower reactions, although mixed synthetic/carboxylic acid soap mixtures can be employed.

The over-polymerization reaction is somewhat sensitive to pH and is best carried out in the pH range of from about 3 to 8, with the faster reactions observed at the lower end of the latter range. A more preferred pH range is from 5 to 7.

The over-polymerization is, as indicated above, sensitive to reaction temperature. Below about 40° C., the reaction is very slow. In the range of 60° to 65° C. the rate of depolymerization of AMS relative to the rate of its copolymerization with MMA appears to be nearing equality such that above the latter range the combined AMS content of the binary copolymer is increasingly lower than the proportion in the monomeric mixture. A practical upper temperature is about 75° C. The preferred range is from about 50° to about 70° C.

The binary copolymer should have an intrinsic viscosity (measured in toulene @ 770 F.) of at least 0.35. The intrinsic viscosity can be as high as 3.0 or higher, although it is preferred for a best balance of impact strength, HDT and process ability that the copolymer have an intrinsic viscosity of at least 0.5 and most preferably an intrinsic viscosity in the range of from about 0.50 to about 1.25.

The strong dependence of binary copolymer molecular weight on catalyst concentration requires that the catalyst concentration be held at low levels. While the various water-soluble peroxygen-types of catalyst vary in their efficiency, and their molar equivalent quantity varies with their molecular weight, it is generally preferred to employ an amount of catalyst equivalent (in catalytic activity) to an amount of potassium persulfate between about 0.03 part by weight up to about 0.30 part by weight per 100 parts by weight of mixed monomers. The sharp dependence of molecular weight (in reactions carried out at 70° C.) on catalyst concentration is shown below:

| Parts/wt. K$_2$S$_2$O$_8$ per 100 parts/wt. of monomers: | Binary copolymer intrinsic vis. (Toluene @ 77° F.) |
| --- | --- |
| 0.050 | 1.3 |
| 0.093 | 1.0 |
| 0.150 | 0.75 |
| 0.200 | 0.60 |

The preferred catalyst concentrations produce high yields (i.e. about 90% or more) in reasonable reaction times at reaction temperatures of 50° to 70° C.

The over-polymerization reaction does not appear overly sensitive to the concentration of emulsifier. Little effect on copolymer composition or product properties is noted in going from 0.5 to 1.5 parts by weight of a given synthetic emulsifier per 100 parts by weight of mixed monomers. The lower polymerization temperatures seem to require more emulsifier since about 1 part by weight per 100 parts by weight of mixed monomers is satisfactory at 50° C. as compared to about 0.5 part by weight at 70° C. Depending on the electrolyte content of the latex from about 0.25 to as much as 2 parts by weight of emulsifier per 100 parts by weight of mixed monomers usually will suffice.

TERPOLYMER COMPOSITION AND CHARACTERISTICS

The terpolymer for use in the products and method of this invention must be (1) rubbery (as opposed to resinous) in order to impart impact resistance; (2) high in gel-content (at least about 30% gel, more preferred at least 75% gel) in order to be tough and insure retention of impact strength under shear and to maintain high HDT values; (3) high in molecular weight as evidenced by a Mooney viscosity (ML-4" after 4 min. at 212° F.) of at least 85 and preferably at least 100, for toughness and stability; and (4) of specified composition in order to be stable, to be of the desired degree of compatibility with the binary copolymer, to have an index of refraction similar to that of the binary copolymer and thereby impart best transparency and to develop the necessary impact and HDT properties. The terpolymer must be prepared from a monomeric mixture containing from about 35% to no more than about 55% by weight of butadiene to achieve the finite but low unsaturation found so necessary for impact resistance, stability and high HDT characteristics. Other rubbery materials of still lower unsaturation have been evaluated without any observable impact improvement. More highly unsaturated rubbers likewise failed significantly to improve the impact strength of the binary AMS/MMA copolymers. As will be shown herein, the desired terpolymers are prepared from mixture containing from about 35% to about 55% by weight of combined butadiene, from about 5% to about 30% by weight of methyl methacrylate and the remainder constituting from about 20% to about 60% by weight of methyl acrylate to impart good impact strength without impairing the normally high HDT properties of the binary AMS/MMA copolymers. A more preferred composition for the terpolymer is from about 45% to about 50% by weight of butadiene, from about 15% to about 30% by weight of methyl methacrylate, and the remainder constituting at least 20% by weight of methyl acrylate.

TERPOLYMER LATEX PREPARATION

The terpolymer is prepared by polymerization in aqueous emulsion by known techniques and involving either (1) use of lower than normal proportions of mercaptan-type modifiers or (2) carrying the reaction to high conversion in the presence of modifiers, either of these techniques favoring formation of a high-gel, high Mooney terpolymer. For example, polymerization of the three-component monomeric mixture to ordinary conversion levels of 60 to 75% with no modifier or at least very low levels usually produces high-gel, high-Mooney terpolymers. Also, if the conversion is carried to at least 85%, and preferably at least 90%, there will be produced very tough, high-gel, high Mooney terpolymers, even in the presence of normal modifier levels. High conversion terpolymers are preferred.

The monomers for the rubbery terpolymer may be batch-charged or they may be added incrementally or continuously during the course of the reaction. Best results have been achieved by batch-charging the total amount of monomers at the start of the reaction. Since it is preferred to produce the terpolymer in the form of a latex containing fine particles, it is desirable to prepare the reaction mixture by charging the full amount of water, emulsifier, and catalyst and then soon add the full amount of monomers, a procedure adapted to insure a very fine particle size in the resulting latex.

The three-component monomeric mixture polymerizes easily and rapidly in aqueous emulsion at temperatures of from about 0° to about 75° C., more preferably between about 20° C. and 60° C. Any of the known emulsifying agents including the synthetic sulfates and sulfonates and the fatty acid or carboxylic acid soaps can be employed. The synthetic emulsifiers such as dodecyl benzene sodium sulfate, sodium lauryl sulfonate, and the like produce more stable latices of finer particle size and are preferred. Mixtures of synthetic and fatty acid soaps may be employed, if desired.

Polymerization modifiers such as t-dodecyl mercaptan may be employed, as explained above. Water-soluble peroxygen-type catalysts such as potassium persulfate, persulfate/bisulfite redox systems, iron-chelate/peroxide, sulfoxylate and other known catalysts may be employed in a normal manner. Buffers, chelating agents and other known polymerization adjuvants are desirably employed in the usual fashion.

As is usual in the preparation of other synthetic rubbers, the polymerization is desirably terminated by addition of a polymerization shortstop at the desired conversion. The resulting latex, unless employed immediately in the over-polymerization is desirably stabilized by addition of an antioxidant solution or dispersion, preferably of the non-staining, nondiscoloring type such as t-butyl-para-cresol. It is essential that the terpolymer latex be stripped of its residual unreacted monomer is order to avoid contamination of the binary copolymer coating, and this is accomplished in the normal manner by stripping in a distillation column under vacuum.

WORK-UP OF OVERPOLYMERIZED PRODUCT

The over-polymerization reaction described above produces a latex of over-polymerized rubbery particles containing the residual unreacted monomers from which the residual monomers and the water must be removed to obtain a useful solid thermoplastic. The removal of water may be effected by the usual salt/acid method of coagulation; by adding the latex to alcohol or to an acetone/water mixture; or by freeze-coagulation; or by any other method. Likewise, the latex may be spray-dried to obtain a powdery form of the product. The choice of the various coagulation and/or drying procedures will be determined mainly by the particle size and degree of purity desired in the final product. Freeze-coagulation and coagulation by alcohol or acetone produce very fine particle sizes and since they do not involve addition of electrolyte, they produce a purer product than, for example, spray-drying where the product contains the full amount of the soaps and electrolyte present in the latex. The coagulum obtained by any of the described coagulation methods requires drying, preferably in a vacuum oven at 50° to 175° C. for up to about 24 hours.

It is absolutely essential to remove all of the unreacted monomers from the product. As will be seen below, as little as 0.5 to 1% by weight of absorbed or dissolved monomers in the product has a pronounced softening or plasticizing action quite deleterious to good HDT values:

| Percent weight absorbed monomeric, AMS: | HDT, ° C. (annealed) |
|---|---|
| 0.00 | 153 |
| 0.50 | 143 |
| 1.60 | 136 |
| 2.00 | 134 |
| 2.50 | 130 |

Alpha-methyl styrene is a high boiling material (B.P. 163.4° C. at 1 atm.) having considerable solubility in the final composite product. As a result, it is very difficult to remove the last 2%/wt. of the residual AMS in the latex by ordinary steam/vacuum stripping techniques. As a result, it is better to effect coagulation or precipitation of the latex and treat the resulting solid product to remove the residual monomers. The freshly-precipitated coagulum, before drying can be extracted with a low boiling solvent such as hot or boiling methanol or ethanol to extract the residual AMS monomer. This is accomplished most readily by re-slurrying the granular product in alcohol and heating the slurry to boiling under reflux for an hour or two or more. Several successive such treatments may be employed. Another method involves heating the dried granular material in a vacuum oven at 140° to 160° C. for 8 to 12 hours or more, this method usually effecting essentially complete removal of residual AMS. A more practical, less time-consuming method is to pass the coagulum through an extruder-drier having several vacuum-expansion sections in series along its barrel. The material is heated to temperatures in the range of 145 to 300° C. or more and is intensely worked exposing large surface areas for flashing off of the monomeric AMS. The discharge end of such a machine may be equipped with an exfoliating type die plate which forms the hot extrudate into shapes having a large surface area to volume ratio ensuring further flashing off of AMS. After such a treatment, the extrudate is milled into sheets, chopped, pelletized, cubed or disintegrated to a desired form after leaving the extruder. Product treated by any of these methods will have HDT values at least 10 to 15° C. higher and finally-shaped articles thereof will have a lower porosity than those of a product not so treated. Finally, it is desirable to re-dry the once-dried granular plastic just prior to final processing to remove traces of absorbed moisture and avoid variable porosity in the final molded or shaped article.

COMPOUNDING

The final dried, monomer-free product is usually compounded with a light-colored or non-staining type of antioxidant such as di(2 - hydroxy -3 - t - butyl - 5 methylphenyl) methane or other similar hindered phenols. Usually, from about 0.50 to about 2.0 parts/wt. of such an antioxidant per 100 parts/wt. of the product are employed. Also, from about 0.5 to 2.5 parts/wt. of a lubricant such as wax or calcium stearate may be added at the same time. Any colorants and/or opacifying fillers, ultraviolet absorbers and other conventional compounding ingredients also are added at this time. A preferred procedure is to combine the alloy with all compounding ingredients in an internal mixer such as a Henschel mixer to thoroughly blend the powdered ingredients and break up all agglomerates. The resulting uniform powder blend may be used directly in further processing such as by mill-mixing, extrusion, injection molding, calendering, and the like. The products of this invention require fluxing at a temperature of from about 185° to about 250° C., more preferably from about 200° to about 225° C. followed by annealing as indicated below to develop optimum properties.

ANNEALING

The over-polymerized alloys of this invention, after compounding, mixing and molding or shaping to the final finished article will be very substantially improved in HDT values if subjected to an annealing process. The thermoplastic shaped article is heated in air or under an inert atmosphere for at least 15 to 30 minutes and preferably about one hour at a temperature of at least 100° C. up to 175° C. The data below illustrates the order of magnitude of the improvement achieved by this treatment.

| Sample No. | HDT Values at 264 p.s.i., ° C. | | | |
|---|---|---|---|---|
| | Not annealed | Annealed for 1 hour at: | | |
| | | 100° C. | 120° C. | 140° C. |
| 281(Ex. 2 below) | 110 | 116.5 | 126.5 | 131.5 |
| 291(Ex. 2 below) | 112 | 113.5 | 126.0 | 130.5 |

EVALUATION

For test purposes in the examples below, a portion of each compounded powder blend is milled for about three minutes after sheet formation on a two-roll differential plastics mill having its six-inch rolls heated internally by hot oil to a temperature of about 210° C. Stock temperatures will be somewhat higher than this due to frictional heat build-up. The resulting milled sheet is granulated and air-dried once again (to prevent porosity) just before molding. A 3-oz. Ankerwerk reciprocating screw injection molding machine with a five-cavity mold is employed to produce molded bar-type specimens for the tensile, HDT, and notched Izod tests. Barrel and nozzle temperatures employed are respectively, 450° and 470° F., with a mold temperature of about 180° F. and a 30-second cooling cycle before opening the mold. It is found that the alloys of this invention process under temperature and pressure conditions very similar to those employed with the polycarbonates, nylon, etc. Some of the resulting specimen bars for use in Izod tests are annealed by heating at 140° C. for 1 hour. Intrinsic viscosities (ASTM D–1243–60) in toluene at 77° F. are determined by measuring the time of efflux from an Ubbehold viscometer of solutions of the alloy at three different concentrations, the resulting values plotted on a graph of viscosity versus concentration and the curve so delineated extrapolated to zero concentration to obtain the "intrinsic" viscosity, a parameter or number devoid of units. A further description of the term "intrinsic viscosity" is found in the book, "Vinyl and Related Polymers," by C. E. Schildnecht, John Wiley and Sons, New York, 1952.

Density determinations, according to ASTM D–792–60T, Method A, are determined at 23° C. on button-shaped specimens compression molded at 220° C. under 7,500 p.s.i. pressure.

The invention will be more fully described by reference to the several specific examples which follow.

EXAMPLE I

Terpolymer latices

In this example, several rubbery terpolymer latices are prepared by polymerizing mixtures as given below. Recipe "A" produces a fine particle size latex while Recipe "B" a larger particle size. The materials utilized are:

| Ingredients | Recipe "A" small particle | Recipe "B" large particle |
|---|---|---|
| Distilled water, grams | to 500 | to 450 |
| Emulsifier (10% aq. sol.),[1] ml | 25 | 2.5 |
| Lithium stearate, grams | | 0.5 |
| $K_3PO_4$ (25% aq. sol.), ml | 3.0 | 3.0 |
| $K_2S_2O_8$ (1% aq. sol.), ml | 20.0 | 20.0 |
| Butadiene,[2] grams | X | X |
| Methyl acrylate,[2] grams | Y | Y |
| Methyl methacrylate[2] | [3] | [3] |
| Reaction temperature, °C | 50 | 50 |

[1] A purified form of sodium dodecyl benzene sulfonate, 10% solution in water.
[2] $X+Y+Z=100$ parts/wt., with butadiene ("X") varied from 30 to 50 parts/wt. and methyl acrylate ("Y") also varied from 30 to 50 parts/wt.
[3] $Z=20$ parts/wt.

In these experiments a sealed, glass-lined reaction vessel provided with a stirrer is first charged by a procedure in which the water is added, the reactor and its contents heated to 50° C. while alternately evacuating the vapor space and then flushing with pure nitrogen gas. The vessel and its contents are then cooled to 20° C. while maintaining a slight positive pressure of nitrogen over the liquid. Then the remaining ingredients are added in the order listed. The polymerization reaction proceeds to about 90% conversion in about 20 hours at 50° C. before being vacuum distilled to strip off the residual unreacted monomers. The resulting final latices containing about 24 to 27% total solids are employed in the preparation of over-polymerized alloys as described below. The Recipe "A" latices have particles averaging 475 to 550 A. in diameter whereas the Recipe B latices posses average particle sizes from about 1100 to about 2100 A.

The resulting latices are each employed in over-polymerization reactions carried out at 60° C. using the general recipe below:

Ingredients: Parts/wt.
    Water _____ 297.5
    Emulsifier[1] _____ 1.5
    Latex[2] _____ 25.0
    Alpha-methyl styrene[3] _____ 32.5
    Methyl methacrylate[3] _____ 48.7
    $K_2S_2O_8$ _____ 0.2

[1] Same as shown above in preparation of terpolymer.
[2] Usually about 96 ml. of a latex containing about 26 percent/wt. of total solids.
[3] 75 parts by weight of mixture reacted to about 92% conversion. AMS washed with alkali and distilled before use.

The reaction proceeds to a conversion of about 92% in 20–24 hours producing a stable latex. Each latex is vacuum stripped and then poured into a water/acetone mixture to effect coagulation. The resulting coagulum usually is coarsely granular and is easily filtered off, reslurried in hot alcohol several times and then filtered before being dried in a vacuum oven at about 50° C. for 16–24 hours. The dried product contains large pieces of agglomerated resin which, however, are brittle and disappear during compounding in the powder mixing step.

The resulting alloy products are powder mixed in a high-speed Henschel mixer with 0.5 to 1.0 part by weight of di(2 - hydroxy - 3 - t - butyl-5-methylphenyl)methane antioxidant and 1 to 2 parts by weight of calcium stearate lubricant, all on the basis of 100 parts/wt. of the alloy product. The resulting blended powder is uniformly fine in appearance. The resulting powder is then mixed as described on a 6-inch two roll plastics mill and the resulting fluxed and fused composition evaluated as described above under Evaluation of Product.

In one series of products made as above, only the proportion of rubbery terpolymer in the alloy is varied in an alloy in which the over-polymerized binary copolymer contains about 40%/wt. of combined alpha-methyl styrene and has an intrinsic viscosity from .50 to .80 and the rubbery terpolymer was prepared a mixture of 48 parts by weight of butadiene, 20 parts by weight of MMA and 32 parts by weight of methyl acrylate (94% conversion).

The data are as follows:

TABLE I

| Sample No. | Percent/wt. rubbery terpolymer | Notched Izod, ft. lbs./in. | HDT, °C. (annealed) |
|---|---|---|---|
| 1 (control) | 0 | 0.25 | 152 |
| 2 | 15 | 0.4 | 133.0 |
| 3 | 20 | 0.9 | 134.0 |
| 4 | 22.5 | 1.2 | 129.5 |
| 5 | 25.0 | 1.6 | 130.5 |
| 6 | 27.5 | 2.3 | 127.0 |
| 7 | 30.0 | 2.5 | 119.5 |

These data show clearly that there is no significant improvement in impact strength until the proportion of the rubbery terpolymer reaches about 20%/wt. Other experiments indicate that the 35%/wt. level of terpolymer the product has valuable properties but the HDT values are declining at a very rapid rate while further increases in impact strength are quite small. These data thus show commercially balanced properties are obtained only in the 20%–35% range of the rubbery terpolymer.

In another similar series, the principal variable is the proportion of butadiene in the rubbery high conversion (at least 90%) terpolymer. In this series the effectiveness of each terpolymer is evaluated at each of 25%/wt. and 30%/wt. loading of the terpolymer. The over-polymerized binary copolymer in this series averaged 40 percent/wt. of combined alpha-methyl styrene and had an average intrinsic viscosity of .68. The data are as follows:

TABLE II

| Sample No. | Percent/wt. terpolymer | Percent/wt. butadiene in terpolymer monomer mixture | Notched Izod, ft. lbs./in. | HDT, ° C., annealed |
|---|---|---|---|---|
| 1 | 25 | 25 | Negligible | 125.5 |
| 2 | 30 | 25 | 0.4 | 131.5 |
| 3 | 25 | 30 | Negligible | 131.0 |
| 4 | 30 | 30 | 0.5 | 130.5 |
| 5 | 25 | 35 | 0.6 | 132.5 |
| 6 | 30 | 35 | 0.8 | 129.0 |
| 7 | 25 | 40 | 0.8 | 134.0 |
| 8 | 30 | 40 | 1.3 | 126.5 |
| 9 | 25 | 45 | 2.1 | 127.5 |
| 10 | 30 | 45 | 3.1 | 123.0 |
| 11 | 25 | 50 | 2.4 | 133.5 |
| 12 | 30 | 50 | 2.8 | 115.0 |

Since the proportion of butadiene in the monomeric mixture and "combined" butadiene content of the terpolymer are very nearly the same when the terpolymerization is carried to high conversion, the composition of the terpolymer may be referred to in these and other examples herein in terms of "combined" butadiene content. When operating at lower conversion, however, it is more accurate to refer to the actual proportion of butadiene in the monomeric mixture as charged.

It is clear that a least 35%/wt. of butadiene is required in the terpolymer in order for the terpolymer to impart a significant improvement in impact strength. Impact strength continues to increase up to about 45% of butadiene but is still high at 50% and an interdependence is shown between the proportion of the terpolymer in the alloy and its combined butadiene content when these values are related to the HDT values. At 50%/wt. of butadiene in the terpolymer, the HDT value is much higher at the 25% terpolymer loading than at the 30% loading. Other data show these same effects up to about 55%/wt. of butadiene in the terpolymer. The products are excellent throughout the preferred range of 40–50%/wt. of butadiene in the terpolymer and 25% to 30% range of terpolymer loading.

Still a third series of experiments are carried out in which the principal variable is the proportion of combined methyl methacrylate in the terpolymer. In this series at least one terpolymer latex (Recipe "A") is prepared with each combination of each of 40%, 45%, and 50%/wt. of butadiene in the mixture with, respecitvely, 5%, 10%, 15%, 20%, 25%, and 30%/wt. methyl methacrylate, while the methyl acrylate is from 20% to 55%/wt. of the mixture. In addition, each of these alloy products is prepared at each of the 25% and 30% terpolymer loadings, making a total of 35 different combinations. In each case, the binary copolymer contains an average of about 40%/wt. of combined alpha-methyl styrene and exhibits an average intrinsic viscosity of 0.68. The data are as follows:

TABLE III

| Percent MMA monomeric mixture in terpolymer | Percent/wt. terpolymer in alloy | Notched Izod, ft. lbs./in., butadiene in monomeric mixture | | |
|---|---|---|---|---|
| | | 40%/wt. | 45%/wt. | 50%/wt. |
| 5 | 25 | 0.6 | 0.6 | 1.3 |
| 10 | 25 | 0.6 | (¹) | 1.3 |
| 15 | 25 | 0.6 | 0.7 | 1.3 |
| 20 | 25 | 0.9 | 0.6 | 2.2 |
| 25 | 25 | 0.8 | 0.8 | 1.9 |
| 30 | 25 | 0.7 | 0.6 | 2.4 |
| 5 | 30 | 0.7 | 1.2 | 1.5 |
| 10 | 30 | 0.8 | 1.1 | 1.5 |
| 15 | 30 | 0.8 | 0.9 | 1.5 |
| 20 | 30 | 0.7 | 1.1 | 2.8 |
| 25 | 30 | 0.7 | 1.2 | 2.3 |
| 30 | 30 | 0.7 | 1.0 | 2.5 |

¹ Not determined.

It is clear that the impact strength slowly increases (at lower terpolymer loadings) up to a methyl methacrylate level of in the range of 15 to 30%/wt. and then begins to decrease although this effect is not shown at the 45% and 50% levels of butadiene in the terpolymer monomeric mixture. The effect of the level of methyl methacrylate is a mild one but nevertheless the 5 to 30% range is demonstrated as operable and that terpolymers containing this range of methyl methacrylate are better than those not containing this monomer and better than terpolymers higher in methyl methacrylate level. Although not shown for lack of space, the HDT values of all of the above alloys were above 110° C. and these values are better for the above compositions than those of compositions outside this range.

Still a fourth series of alloys are prepared employing terpolymer latices prepared with the principal variable being the size of the latex particles. In this series the terpolymer monomer mixture contained 50%/wt. of butadiene, 20%/wt. methyl methacrylate and 30%/wt. of methyl acrylate. The over-polymerized binary copolymer is controlled at an average value of 40%/wt. of combined AMS and an average intrinsic viscosity of 0.65. The data are as follows:

TABLE IV

| Terpolymers latex particle size, A. | Percent/wt. terpolymer in alloy | Percent/wt. butadiene in terpolymer monomeric mixture | Notched Izod, ft./lbs./in. | HDT, ° C. |
|---|---|---|---|---|
| 2,050 | 30 | 30 | 1.4 | 126.5 |
| 1,960 | 30 | 40 | 1.45 | 122.0 |
| 1,830 | 30 | 50 | 1.11 | 117.5 |
| 1,400 | 30 | 30 | 0.30 | 119.0 |
| 1,100 | 30 | 40 | 2.10 | 127.5 |
| 950 | 30 | 50 | 1.70 | 115.0 |
| About 475 | 30 | 30 | 0.50 | 130.3 |
| About 500 | 30 | 40 | 1.32 | 126.5 |
| About 500 | 30 | 50 | 2.82 | 115.0 |

Over the range of particle size shown in Table IV, the terpolymer is shown to be a very effective impact improver with minimal effect on HDT. Similar results are shown with still larger latex particles. These results are not shown with solid, massive or non-particulate forms of the terpolymer. The blending of mill-mixed sheets of the rubbery terpolymer with a separately-prepared binary copolymer is not a practical procedure due to the great hardness of the binary copolymer, the limited compatibility of the two materials and the unreliable dispersion obtained.

EXAMPLE II

In this example, a closer evaluation of the nature and physical properties of the terpolymer is obtained. A series of six terpolymers are prepared at 50° C. using procedures similar to those of Example I and the following recipe:

Ingredient: Parts/wt. per 100 parts monomers
Water _____ 354
$K_3PO_4$ _____ 1.0
Emulsifier (as 10% Aq. Sol.) ¹ _____ 2.5
$K_2S_2O_5$ _____ 0.1
t-Dodecyl mercaptan (varied) _____ 0.1 to 0.25
Butadiene _____ 47.5
Methyl methacrylate _____ 20.1
Methyl acrylate _____ 32.5
$K_2S_2O_8$ _____ 0.2

¹ Similar to that used in Example I.

In four of the six experiments carried out, the materials are charged all at once to a nitrogen-purged reactor in the order listed and the reaction carried out for 18 to 28 hours until 85 to 95%/wt. of the monomers has reacted. In the remaining two experiments, respectively, only 50% and 45%, respectively, of the amount of butadiene is added with the initial charge which is otherwise in the order listed above. In these latter two experiments, the remainder of the butadiene monomer is metered into the reactor in increments during the reaction. In each case, the latex obtained is vacuum stripped to remove the unreacted monomers. No stabilizer is added to the latex before its immediate use in the subsequent over-polymerization. A portion of each latex is stabilized and subjected to a conventional salt/acid coagulation and the resulting coagulum dried in a vacuum oven at 50° C. to obtain samples for a sol/gel determination. The data are as follows:

binary over-polymer (Experiment No. 1 below) is prepared by using a $K_2S_2O_8/K_2S_2O_5$ redox catalyst system at 50° C. with no modifier. In other experiments the molecular weight (Experiment No. 2) is decreased by increasing the reaction temperature with an ordinary

| Experiment No. | Type | Percent gel | Mooney viscosity, ML–4' at 212° F. | Percent conversion | Reaction time, hrs. | Density at 23° C. | DN, A.[1] |
|---|---|---|---|---|---|---|---|
| 157 | Batch | 66 | 108 | 85 | 24 | 1.0172 | 517 |
| 161 | Metered | 85 | 140 | 79.5 | 10 | 1.0033 | 473 |
| 195 | Batch | 88 | 117 | 92 | 28 | 1.0024 | 475 |
| 210 | do | 88 | 122 | 79.5 | 18 | 1.0248 | 554 |
| 230 | do | 88 | 169 | 94 | 28 | 1.0052 | 510 |
| 266 | Metered | 33 | 105 | 79.4 | [2] 10.2 | 1.0254 | 534 |

[1] Average latex particle diameter, in A.
[2] Reaction temperature: 55° C.

Note that all of these rubbery terpolymers (except No. 266) are very highly gelled and all have a Mooney viscosity over 100.

The latices of this example are employed in the preparation of over-polymerized alloys using a recipe and procedure similar to those described in Example I, in each case employing a mixture of 32.5 parts/wt. of AMS and 48.7 parts/wt. of MMA which is polymerized to a target conversion of about 92%. In the evaluation of this series, several commercially-available high temperature thermoplastics are included to serve as a comparison, these being:

(1) "Cycolac X–27," made by Marbon Division of Borg-Warner, said to be a high HDT ABS plastic.
(2) "Kralistic K–2938," made by Uniroyal, and said $K_2S_2O_8$ (non-redox) catalyst to 60° C., and in Experiments 3 and 4 the molecular weight is still further reduced by addition (Experiment No. 3) of 0.1 part/wt. per 100 parts/wt. of monomers of t-dodecyl mercaptan and (Experiment 4) by 0.2 part/wt. of this same modifier. In each experiment, four separate over-polymers are prepared, one each at the 25% and 30% rubber level with a high conversion prepared terpolymer from a monomeric mixture containing 50%/wt. of butadiene and the two over-polymers employing a terpolymer prepared from a mixture containing 45%/wt. of butadiene (i.e. total of eight products). The preparation of these products is otherwise similar to the procedures of the foregoing examples. The data are as follows:

| Experiment No. | Overpolymer intrinsic viscosity (toluene at 77° F.) | 50% butadiene | | | | 45% butadiene | | | |
|---|---|---|---|---|---|---|---|---|---|
| | | Izod at 25% rubber | Izod at 30% rubber | HDT,°C. at 25% rubber | HDT,°C. at 30% rubber | Izod at 25% rubber | Izod at 30% rubber | HDT,°C. at 25% rubber | HDT,°C. at 30% rubber |
| 1 | 1.5 | 1.8 | 2.6 | 128 | 128.5 | 1.4 | 2.0 | 127.6 | 128 |
| 2 | 1.0 | 2.4 | 2.8 | 128.5 | 133.3 | 2.1 | 3.1 | 127 | 127.5 |
| 3 | 0.65 | 2.5 | 3.1 | 128.7 | 135 | 2.4 | 2.8 | 130.5 | 133.5 |
| 4 | 0.50 | 2.0 | 2.5 | 132.3 | 135.3 | 1.2 | 2.2 | 133.0 | 136.6 | to be a high HDT ABS plastic.
(3) Hi-Temp Geon, made by B. F. Goodrich Chemical Company, an after-chlorinated polyvinyl chloride.

In the above series, the flow rate observed increases as molecular weight decreases. Milling also becomes easier at the lower molecular weights and the milled sheet

| Overpolymer No. | Terpolymer No. | Percent/wt. rubber | Overpolymer intrinsic viscosity | Overpolymer density at 23° C. | Annealed HDT,° C. | Non-annealed HDT,° C. | Izod, R.T. | Izod, 0° C. | Tensile R.T. lbs./in. |
|---|---|---|---|---|---|---|---|---|---|
| 180 | 161 | 27.5 | 0.590 | 1.1096 | 122.0 | 107.0 | 2.5 | 2.1 | 4,600 |
| 291 | 161 | 25.0 | 0.512 | 1.1136 | 130.5 | 113.0 | 1.4 | 1.1 | 5,800 |
| 200 | 157 | 27.5 | 0.775 | 1.1049 | 123.0 | 110.0 | 2.8 | 2.3 | 3,900 |
| 256 | 157 | 27.5 | 0.798 | 1.0964 | 130.5 | 109.5 | 2.9 | 2.6 | 4,000 |
| 216 | 195 | 27.5 | 0.615 | 1.1078 | 127.0 | 110.0 | 1.5 | 1.3 | 4,900 |
| 226 | 210 | 27.5 | 0.610 | 1.1058 | 122.0 | 111.0 | 1.9 | 1.6 | 4,700 |
| 235 | 230 | 27.5 | 0.645 | 1.1026 | 132.0 | 112.5 | 2.7 | 2.2 | 5,300 |
| 259 | 230 | 25.0 | 0.605 | 1.1040 | 133.5 | 113.0 | 1.9 | | 5,700 |
| 281 | 230 | 27.5 | 0.495 | 1.1036 | 131.5 | 110.0 | 1.9 | 1.7 | 5,400 |
| 269 | 266 | 27.5 | 0.455 | 1.1107 | 129.5 | 112.5 | 1.7 | 1.3 | 5,600 |
| 278 | 266 | 25.0 | 0.465 | 1.1121 | 129.0 | 111.5 | 1.6 | 0.9 | 5,700 |
| "Cycolac X–27" | | | | 1.0610 | 105.5 | 98.5 | 0.7 | 0.7 | 6,500 |
| "Kralastic K–2938" | | | | 1.0592 | 105.0 | 95.5 | 2.8 | 1.4 | 6,500 |
| "Hi-Temp Geon" | | | | 1.4928 | 105.0 | 96.0 | 6.9 | 1.3 | 7,500 |

The above data indicates that the batch-charged terpolymers were somewhat more efficient than the terpolymers prepared by metering butadiene. Also, the higher-gel, higher molecular weight (higher Mooney) terpolymers containing 85 to 88% gel and Mooney viscosities of 122 to 169 imparted a better balance of high impact strength and high HDT to the alloy than did those lower in gel and Mooney viscosity. It is especially interesting to observe that the over-polymerized alloys of this invention have matched or exceeded the other known high temperature thermoplastics in Izod impact and, of course, have considerably higher HDT values.

EXAMPLE III

In this example, the effect of the molecular weight of the binary over-polymerized copolymer on alloy properties is evaluated. In this series a high molecular weight is smoother at the lower molecular weights. The impact strength is greater in the intrinsic viscosity range of 0.65 to 1.0. The HDT values are excellent in all experiments. Best balance of impact strength and HDT appears to be in the 0.65 to 1.0 viscosity range.

What is claimed is:

1. A thermoplastic, impact- and heat-resistant resinous alloy comprising, as polymeric constituents, from about 65 to about 80% by weight of a binary copolymer of alpha-methyl styrene and methyl methacrylate and, uniformly distributed through said binary copolymer, from about 20% to about 35% by weight of latex-sized particles of a highly-gelled terpolymer synthetic rubber of a low degree of unsaturation, said binary copolymer containing from about 35% to about 65% by weight of combined alpha-methyl styrene and having an intrinsic viscosity of at least 0.35, said terpolymer being prepared from a monomeric mixture containing from about 35% to about 55% by weight of butadiene, from about 5% to about 30% by weight of methyl methacrylate, and the remainder of from about 20% to about 60% by weight of methyl acrylate and said terpolymers containing at least 35% by weight of toluene-insoluble gel, its said particles ranging in average diameter from about 100 to about 8000 A. and having a Mooney viscosity after four minutes at 212° F. using the 4-inch rotor of at least 85, said binary copolymer having been prepared in the presence of said terpolymer.

2. An alloy as defined in claim 1 and further characterized by containing less than 0.5% by weight of residual monomers, by having been annealed by heating for at least 15 minutes at a temperature in the range of from about 100° to about 175° C. so as to possess a HDT according to ASTM D-648 at 264 p.s.i. of at least 115° C.

3. An alloy as defined in claim 1 and further characterized by having been fluxed and fused at 185° to 250° C. and then annealed by heating for at least 15 minutes at a temperature in the range of 100° to 175° C.

4. A thermoplastic, impact- and heat-resistant alloy consisting of, as polymeric constituents (a) from about 65 to about 80% by weight of a coating of a binary copolymer of alpha-methyl styrene coated on (b) from about 20% to about 35% by weight of latex-sized particles of a highly-gelled rubbery terpolymer synthetic rubber low in unsaturation, said binary copolymer containing from about 35% to about 65% by weight of combined alpha-methyl styrene and methyl methacrylate and having an intrinsic viscosity of at least 0.5, said terpolymer synthetic rubber being prepared from a monomeric mixture containing from about 35% to about 55% by weight of butadiene, from about 5% to about 30% by weight of methyl methacrylate, and the remainder constituting from about 20% to about 60% by weight of methyl acrylate and said synthetic rubber containing at least 75% by weight of toluene-insoluble gel and having a Mooney viscosity (ML-4 after 4 minutes at 212° F.) of at least 85, and said alloy having an ASTM D-648 heat distortion temperature of at least 115° C. when annealed by heating for from 15 minutes to one hour at temperatures of 100° to 175° C., said binary copolymer having been prepared in the presence of said terpolymer.

5. In a method of making a thermoplastic, impact- and heat-resistant alloy of a binary copolymer of alpha-methyl styrene and methyl methacrylate and a rubbery butadiene synthetic rubber, the improvement which comprises the steps of (1) mixing from about 20% to about 35% by weight on a dry solids basis of
   (a) a latex containing latex particles from about 100 to about 3500 A. in average diameter of a rubbery terpolymer synthetic rubber prepared from a monomeric mixture containing from about 45% to about 50% by weight of butadiene, from about 15% to about 30% by weight of methyl methacrylate and the remainder constituting at least about 20% by weight of methyl acrylate, said synthetic rubber containing at least 75% by weight of toluene-insoluble gel and having a Mooney viscosity (ML-4 after 4 minutes at 212° F.) of at least 100, and
   (b) a monomeric mixture containing from about 30% to about 70% by weight of alpha-methyl styrene and the remainder methyl methacrylate,
(2) effecting polymerization of said mixture in aqueous emulsion at 45° to 75° C. at a pH of 5 to 7 thereby to envelope said latex particles in a hard coating of a binary copolymer containing from about 35% to about 65% of combined alpha-methyl styrene and having an intrinsic viscosity in toluene at 77° F. of at least 0.5, (3) removing the water from the resulting latex, and (4) heating the resulting solid alloy at a temperature of from about 150° to about 300° C. under vacuum to effect removal of any monomeric alpha-methyl styrene in said alloy.

6. A method as claimed in claim 5 wherein said method is further characterized by the further added steps of forming a shaped article from the said solid alloy and heating said article at a temperature of from about 100° to 175° C. for a period of from 15 minutes to one hour to effect annealing thereof.

References Cited

UNITED STATES PATENTS

| | | | |
|---|---|---|---|
| 2,887,464 | 5/1959 | Coover et al. | 260—887 |
| 3,029,222 | 4/1962 | Brisken | 260—880 |
| 3,230,277 | 1/1966 | Schramm | 260—880 |
| 3,392,157 | 7/1968 | Izumi | 260—887 |

JAMES A. SEIDLECK, Primary Examiner

U.S. Cl. X.R.

260—29.7, 80.7, 86.7, 887, 892; 264—235